US009737192B2

(12) United States Patent
Ranasinghe et al.

(10) Patent No.: US 9,737,192 B2
(45) Date of Patent: Aug. 22, 2017

(54) DOOR LATCH INTERRUPTION UPON DETECTION OF CURRENT LEAKAGE

(71) Applicant: General Electric Company, Schenectady, NY (US)

(72) Inventors: Sajeev Lathika Ranasinghe, Louisville, KY (US); Andrew Leroy Reder, Louisville, KY (US); Timothy David Kaiser, Clarksville, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 559 days.

(21) Appl. No.: 14/165,662

(22) Filed: Jan. 28, 2014

(65) Prior Publication Data
US 2015/0214720 A1 Jul. 30, 2015

(51) Int. Cl.
*H02H 3/16* (2006.01)
*A47L 15/42* (2006.01)
*H02H 3/33* (2006.01)
*H02H 5/04* (2006.01)

(52) U.S. Cl.
CPC ........... *A47L 15/4259* (2013.01); *H02H 3/33* (2013.01); *H02H 5/04* (2013.01); *Y10T 307/865* (2015.04)

(58) Field of Classification Search
CPC ....... G05B 2219/24053; A47L 15/0049; A47L 2401/26; A47L 2401/34; A47L 2501/28; A47L 2501/32; G01R 31/025
USPC .......................................................... 361/42
See application file for complete search history.

(56) References Cited

U.S. PATENT DOCUMENTS

| | | | | |
|---|---|---|---|---|
| 3,028,870 A * | 4/1962 | Fay | ...................... | A47L 15/4259 134/58 DL |
| 4,245,309 A * | 1/1981 | Kiefer | ................ | G05B 19/0426 134/57 D |
| 4,418,398 A * | 11/1983 | Hornung | ................ | D06F 33/02 700/12 |
| 4,538,267 A * | 8/1985 | Uchida | .................. | G03G 15/55 399/12 |
| 4,564,642 A * | 1/1986 | Bussemeier | ............. | B01J 23/74 518/715 |
| 5,182,755 A * | 1/1993 | Sekiguchi | ............. | F02D 41/266 700/81 |
| 6,125,870 A * | 10/2000 | Furmanek | ............. | D06F 39/081 137/2 |
| 6,294,767 B1 * | 9/2001 | Sargeant | ............. | A47L 15/0021 219/481 |
| 8,144,440 B2 * | 3/2012 | Aoki | ........................ | F24C 7/08 361/42 |
| 2005/0141154 A1 * | 6/2005 | Consadori | ............... | H02J 3/005 361/62 |

(Continued)

FOREIGN PATENT DOCUMENTS

EP 1 269 906 A1 1/2003

*Primary Examiner* — Thienvu Tran
*Assistant Examiner* — Tien Mai
(74) *Attorney, Agent, or Firm* — Dority & Manning, P.A.

(57) ABSTRACT

Appliances that include a ground fault door latch trip circuit that leverages a door latch circuit of the appliance to open one or more component relays upon detection of a current leakage event are provided. In particular, the ground fault door latch trip circuit can provide one or more shunt paths when a ground fault event is detected. The shunt paths can shunt current from a door latch to ground, such that the door latch circuit operates as if the door of the appliance has been opened.

11 Claims, 6 Drawing Sheets

(56) References Cited

U.S. PATENT DOCUMENTS

| | | | |
|---|---|---|---|
| 2011/0260553 A1* | 10/2011 | Poyner | A47L 15/0049 |
| | | | 307/115 |
| 2013/0069512 A1* | 3/2013 | Zimmer | H05B 6/6417 |
| | | | 312/326 |
| 2015/0077243 A1* | 3/2015 | Hooper | H02H 3/16 |
| | | | 340/532 |

* cited by examiner

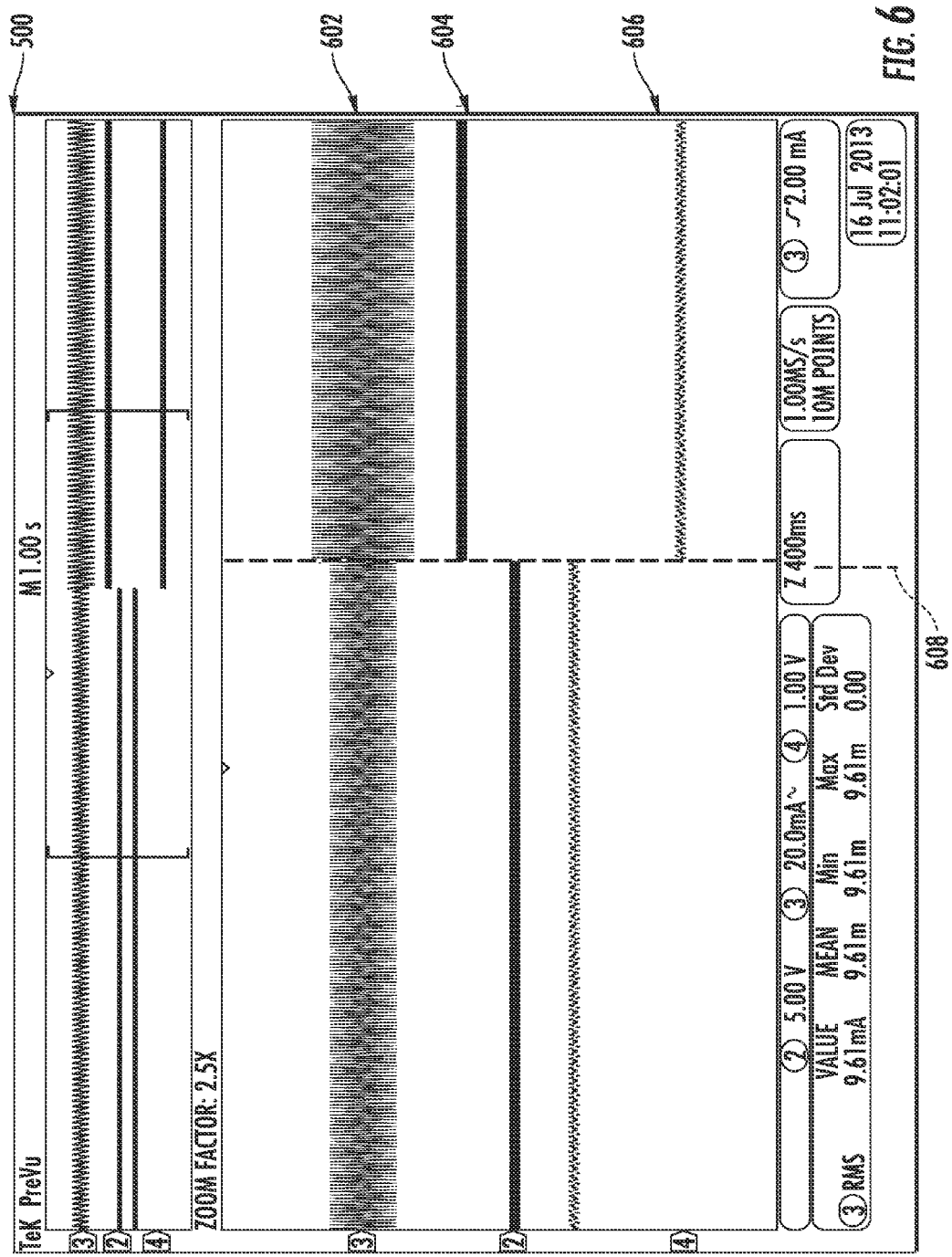

DOOR LATCH INTERRUPTION UPON DETECTION OF CURRENT LEAKAGE

FIELD OF THE INVENTION

The present disclosure relates generally to current leakage detection and response in appliances. More particularly, the present disclosure is directed to appliances that include a ground fault door latch trip circuit that leverages a door latch circuit of the appliance to open one or more component relays upon detection of a current leakage event.

BACKGROUND OF THE INVENTION

A current leakage event, also known as a ground fault, can occur when an unintended ground, such as water or a human being, comes into electrical contact with one or more electrical circuits of a device. Due to the connection with such ground, current leaks from the device through an unintentional path, which can potentially cause a number of problems, including, for example, fire, damage to system components, or, in the instance that the ground is a person, electrical shock or electrocution.

One attempted solution to the problem of ground faults is the inclusion of a ground fault interrupter in the device. The ground fault interrupter can detect the ground fault condition and interrupt power to the device. Ground fault interrupters can be stand-alone devices or can be built into the hardware of the device.

Ground fault interrupters typically operate by measuring the current leaving the Line side of the power source and comparing it to the current returning to the neutral side. If the difference between these measurements is significant, then it can be assumed that some of the current is flowing along an unintended path and therefore a ground fault event has occurred.

Upon detecting the ground fault, the ground fault interrupter can initiate operations which lead to shutting off power to the device. As an example, the ground fault interrupter can be an integrated circuit that provides a ground fault signal upon detecting the current leakage condition. The ground fault signal can be used to drive an electromechanical relay that will cut power to the entire device.

However, certain existing ground fault interrupter configurations exhibit undesirable behavior that can be frustrating to a user of the device. In particular, once typical ground fault interruption circuits have been tripped, the device will need to be manually reset, requiring a user to make a service call for an electrician or other experienced repair person to identify and resolve the problem.

As another example, if the ground fault interrupter trips a relay or other switch such that power is completely shut off to the device, then the device is unable to perform any "self-diagnosis" or provide the user with any indication of the problem, instructions, or suggested solution.

Therefore, an appliance that provides a more intelligent and user-friendly response to a current leakage event is desirable.

BRIEF DESCRIPTION OF THE INVENTION

Additional aspects and advantages of the invention will be set forth in part in the following description, or may be apparent from the description, or may be learned through practice of the invention.

One aspect of the present disclosure is directed to an appliance. The appliance includes a powered component. The appliance includes control circuitry for controlling the flow of power from a power source to the powered component. The appliance includes an operation control providing a first signal. The first signal indicates that the powered component should be operating or should not be operating. The appliance includes a current balance monitor providing a second signal. The second signal indicates that the powered component should be operating or should not be operating. The control circuitry is configured to allow the flow of power to the powered component when both the first signal and the second signal indicate that the powered component should be operating. The control circuitry is configured to disallow the flow of power to the powered component when either the first signal or the second signal indicate that the powered component should not be operating.

Another aspect of the present disclosure is directed to an appliance. The appliance includes a powered component. The appliance includes a switch positioned between a first power source and the powered component and configured to allow the flow of power from the first power source to the powered component when the switch is in a closed position. The appliance includes a door latch circuit configured to provide a door latch signal when a door of the appliance is closed and configured to cease providing the door latch signal when the door is open. The door latch signal causes the switch to maintain the closed position. The appliance includes a ground fault interrupter configured to detect current leakage occurring at the appliance. The appliance includes a ground fault door latch trip circuit configured to cause the door latch circuit to cease providing the door latch signal when the ground fault interrupter detects current leakage at the appliance.

Another aspect of the present disclosure is directed to an appliance. The appliance includes a door having a closed position and an open position. The appliance includes a door latch circuit. The door latch circuit is configured to cause the actuation of one or more relays when the door transitions from the closed position to the open position when the appliance is operating. The actuation of the one or more relays prevents one or more components of the appliance from being energized. The appliance includes a ground fault interrupter configured to detect current leakage occurring at the appliance and to provide a ground fault signal when the current leakage is detected. The appliance includes a ground fault door latch trip circuit configured to receive the ground fault signal from the ground fault interrupter and to trip the door latch circuit when the ground fault signal is received such that the one or more relays are actuated.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 6 depicts exemplary signal waveforms according to an exemplary embodiment of the present disclosure.

DETAILED DESCRIPTION OF THE INVENTION

Figure 1A:
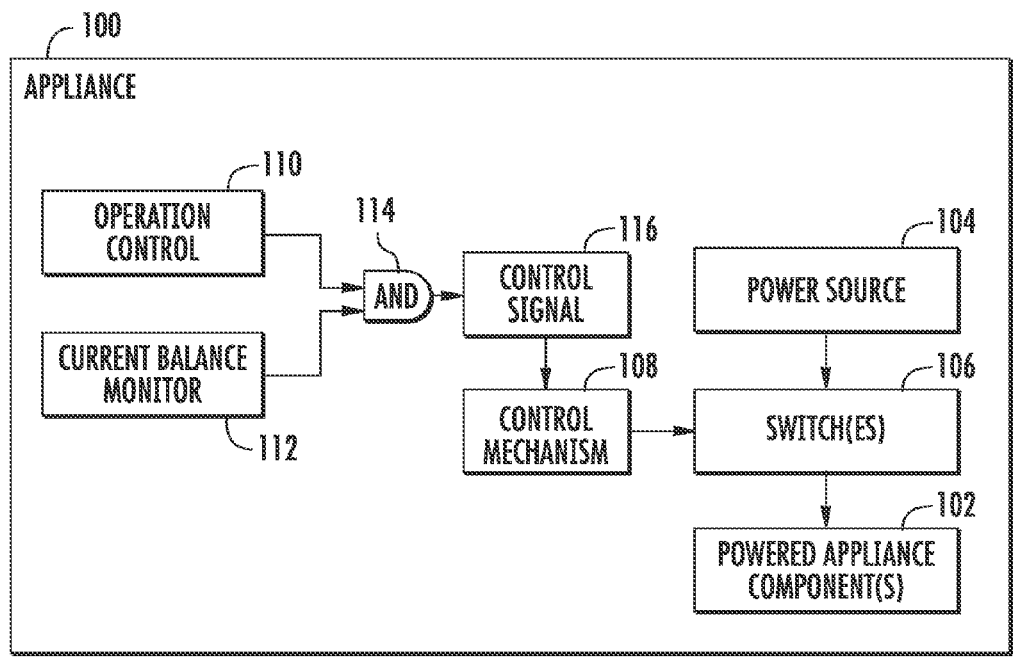
FIG. 1A depicts an exemplary appliance according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1A depicts an exemplary appliance 100 according to an exemplary embodiment of the present disclosure. Appliance 100 can be any suitable type of appliance, including, but not limited to, a dishwasher, a microwave, a washing machine, a dryer, an oven, a refrigerator, an ice machine, a heater, or any other type of appliance.

Appliance 100 can include one or more powered appliance components 102. Powered appliance components 102 can be any components that receive power from a power source 104. Power source 104 can be an alternating current power source or a direct current power source. In the instance that power source 104 is an alternating current power source, power source 104 can include a Line conductor and a Neutral conductor.

As an example, in the instance that appliance 100 is a dishwasher, powered appliance components 102 can include a circulation pump, a drain pump, heating element(s), a water valve, and/or a detergent dispenser. Generally, any arbitrary appliance 100 can include any number of arbitrary powered appliance component(s) 102 that assist in providing the appliance functionality.

One or more switches 106 can be positioned between power source 104 and powered appliance components 102. Switches 106 can control the flow of power from power source 104 to powered appliance components 102. As an example, switches 106 can be relays included in an interlock circuit of appliance 100. The relays can allow the flow of power when they are in a closed position. However, switches 106 can be any other suitable switching components as well, including, for example, TRIACS, thyristors, transistors, or other suitable switching elements.

The one or more switches 106 can be collectively or individually controlled by a control mechanism 108. As an example, in the instance that switches 106 are relays, control mechanism 108 can control the relays by selectively providing power to the relays to place them into the closed position.

Appliance 100 can also include an operation control 110. Operation control 110 can provide a first signal that indicates whether the powered components 102 should be operating or should not be operating.

As an example, operation control 110 can be a door latch. When the door is closed, the door latch can secure an electrical connection to provide an electrical signal indicating that the door is closed and, therefore, the powered component may be safely operated. When the door is open, the door latch can break the electrical connection, so that the electrical signal is not provided, thereby indicating that the door is open and the powered component should not be operated.

In some implementations, the door latch does not require a latch or other component to be manually closed to provide the electrical connection. Thus, for example, the door latch can include two contacts that touch whenever the door is placed into the closed position.

As another example, operation control 110 can include a temperature sensor for detecting when one or more components are approaching an unsafe temperature. Thus, for example, when the temperature detected by the temperature sensor exceeds a threshold value, the first signal provided by operation control 110 can indicate that the powered components 102 should not be operating.

In yet other implementations, operation control 110 can be various other safety components as well. Generally, however, operation control 110 can be any component that provides a signal indicating whether the powered appliance components 102 should be operating or should not be operating based on appliance operations, safety concerns, or other design goals.

Appliance 100 can also include a current balance monitor 112. Current balance monitor 112 can provide a second signal that indicates whether the powered components 102 should be operating or should not be operating.

As an example, current balance monitor 112 can detect an imbalance of current due to a leakage to earth ground. For example, one or more powered appliance components 102 can become grounded, creating an imbalance of current. As another example, current balance monitor 112 can detect an imbalance of current caused by a power imbalance. For example, for a 240 volt application, a leakage can occur from LINE1 to NEUTRAL and/or from LINE2 to NEUTRAL.

When current balance monitor 112 detects an imbalance of current, current balance monitor 112 can provide the second signal indicating that the powered appliance components 102 should not be operating due to safety concerns. Likewise, when current balance monitor 112 does not actively detect an imbalance of current (e.g. detects a balanced current), current balance monitor 112 can provide the second signal indicating that the powered appliance components 102 may, at least from its perspective, be operated safely.

Appliance 100 can include control circuitry for controlling the flow of power to powered appliance components 102 based on the first and second signals respectively received from operation control 110 and current balance monitor 112. The control circuitry can include circuitry for providing or otherwise performing an AND logic gate 114.

In particular, AND logic gate 114 can output a logic signal that turns on a control signal 116 only when both the first and second signals respectively received from operation control 110 and current balance monitor 112 indicate that powered appliance components 102 should be operating. The control signal 116 can be used to inform control mechanism 108 when to close switches 106 such that power flows to powered appliance components 102.

Therefore, when both the first and second signals respectively received from operation control 110 and current balance monitor 112 indicate that the appliance should be operating, the AND gate 114 can turn on control signal 116 to inform control mechanism 108 to close switches 106 and allow the flow of power to powered appliance components 102.

Likewise, when either the first signal or second signal respectively received from operation control 110 and current balance monitor 112 indicate that the appliance should not be operating, then AND gate 114 can turn off the control signal 116 so that control mechanism 108 does not close switches 106 and power does not flow to powered appliance components 102.

In such fashion, the control circuitry of appliance 100 can control the flow of power to the powered appliance components 102 by simultaneously considering signals from the operation control 110 and the current balance monitor 112.

Furthermore, according to another aspect of the present disclosure, the control circuitry of appliance 100 can provide a diagnostic signal to a microprocessor of appliance 100. The diagnostic signal can indicate whether the control circuit has disallowed the flow of power to powered appliance components 102 because the first signal indicated that the powered components 102 should not be operating or because the second signal indicated that the powered components 102 should not be operating. In such fashion, the microprocessor can distinguish between de-energization of system components due to a ground fault event versus an operational control event.

Figure 1B:
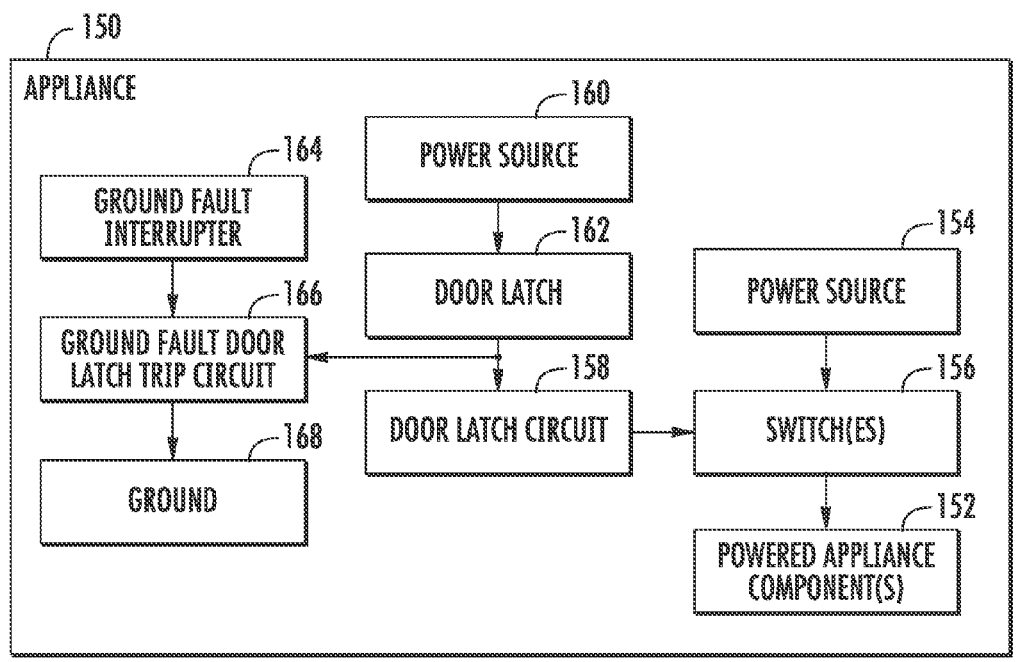
FIG. 1B depicts an exemplary appliance according to an exemplary embodiment of the present disclosure.

FIG. 1B depicts an exemplary appliance 150 according to an exemplary embodiment of the present disclosure. Appliance 150 can be any suitable type of appliance, including, but not limited to, a dishwasher, a microwave, a washing machine, a dryer, an oven, a refrigerator, an ice machine, a heater, or any other type of appliance.

Appliance 150 can include one or more powered appliance components 152. Powered appliance components 152 can be any components that receive power from a power source 154. Power source 154 can be an alternating current power source or a direct current power source. In the instance that power source 154 is an alternating current power source, power source 154 can include a Line conductor and a Neutral conductor.

As an example, in the instance that appliance 150 is a dishwasher, powered appliance components 152 can include a circulation pump, a drain pump, heating element(s), a water valve, and/or a detergent dispenser. Generally, any arbitrary appliance 150 can include any number of arbitrary powered appliance component(s) 152 that assist in providing the appliance functionality.

One or more switches 156 can be positioned between power source 154 and powered appliance components 152. Switches 156 can control the flow of power from power source 154 to powered appliance components 152. As an example, switches 156 can be relays included in an interlock circuit of appliance 150. The relays can allow the flow of power when they are in a closed position. However, switches 156 can be any other suitable switching components as well, including, for example, TRIACS, thyristors, transistors, or other suitable switching elements.

According to an aspect of the present disclosure, appliance 150 can include a door latch circuit 158. Door latch circuit 158 can provide a door latch signal to switches 156 when a door of the appliance is closed and can cease to provide the door latch signal to switches 156 when the door of the appliance is open.

The door latch signal provided by door latch circuit 158 to switches 156 can cause the switches 156 to maintain their closed positions. As an example, the door latch signal can power one or more relays included in the interlock circuit.

The door latch circuit 158 can include or be electrically coupled to a door latch 162. Door latch 162 can secure an electrical connection when the door is closed and break the electrical connection when the door is open.

In some implementations, door latch 162 includes a latch component that must be manually closed by a user to secure the electrical connection. However, in other implementations, the door latch 162 does not require a latch or other component to be manually closed to provide the electrical connection. Thus, for example, the door latch can include two contacts that touch whenever the door is placed into the closed position. As another example, door latch 162 can be any other sensor for determining whether the door is open or closed such as, for example a Hall effect sensor.

When the door latch 162 is closed, power can flow from a power source 160 to the door latch circuit 158. When power flows from power source 160 to door latch circuit 158, door latch circuit can provide the door latch signal to switches 156.

When the door to the appliance is opened during operation, the door latch 162 can stop the flow of power from power source 160 to door latch circuit 158. As a result of the absence of power from power source 160, the door latch circuit 158 can cease providing the door latch signal to switches 156, thereby causing switches 156 to actuate or otherwise change from the closed position to an open position such that powered appliance components 152 are de-energized. In such fashion, powered appliance components 152 can be de-energized when the door to appliance 150 is opened, increasing user safety.

According to another aspect of the present disclosure, appliance 150 can also include a ground fault interrupter 164 and a ground fault door latch trip circuit 166. Ground fault interrupter 164 can detect a current leakage occurring at appliance 150 and provide a ground fault signal to ground fault door latch trip circuit 166 when the current leakage event is detected.

As an example, ground fault interrupter 164 can include a longitudinal transformer and an application specific integrated circuit (ASIC). The transformer can pick up a difference between the current in/out of the Line/Neutral conductors and provide such difference to the ASIC. The ASIC can process the signal from the transformer and output a ground fault signal to ground fault door latch trip circuit 166 when the current differential exceeds a threshold value.

Ground fault door latch trip circuit 166 can trip the door latch circuit 158 when the ground fault signal is received from the ground fault interrupter 164. As an example, when ground fault door latch trip circuit 166 receives the ground fault signal from the ground fault interrupter 164, the ground fault door latch trip circuit 166 can activate one or more switching elements so as to provide one or more shunt paths from the door latch 162 to a ground 168, so that door latch circuit 158 operates as if the door latch 162 was opened.

In other words, by shunting to ground 168 the power flowing through door latch 162 from power source 160, ground fault door latch trip circuit 166 can eliminate the flow of power from power source 160 to door latch circuit 158, thereby simulating a door opening event.

When door latch circuit 158 is tripped, it can actuate switches 156 to the open position, thereby de-energizing powered appliance components 152. In such fashion, ground fault door latch trip circuit 166 can leverage the relationship between door latch 162 and door latch circuit 158 to shut off power to powered appliance components 152 when a ground fault event is detected by ground fault interrupter 164.

Thus, when a ground fault event is detected, appliance 150 can be "tricked" into operating as if the door were opened. In particular, switches 156, such as relays or TRI-ACS can be deactivated, potentially resolving the ground fault and increasing user safety.

Furthermore, according to another aspect of the present disclosure, ground fault door latch trip circuit 166 can provide a diagnostic trip signal to a microprocessor of appliance 150 when it trips door latch circuit 158. In such fashion, the microprocessor can distinguish between de-energization of system components due to a ground fault event versus a door open condition.

Various aspects of the above discussed configuration of appliance 150 have proven to be advantageous. In particular, as discussed above, certain existing ground fault interrupter configurations require a manual reset after tripping. However, the exemplary configuration of appliance 150 can return to normal operation once the current leakage condition has been resolved.

Further, in contrast to certain existing systems, the exemplary configuration of appliance 150 shuts off the power to selected powered appliance components in response to a ground fault event, rather than to the appliance as a whole. Therefore, the appliance can maintain some functionality by powering certain "smart" circuits. For example, because the ground fault door latch trip circuit 166 also provides the trip signal to the microprocessor of appliance 150, the appliance can recognize the existence of the ground fault and provide an indication or instructions regarding a suggested user response. As such, the user is provided with useful information rather than an appliance that simply will not turn on, enhancing user satisfaction.

In addition, because the exemplary configuration of appliance 150 leverages the existence and operation of the door latch circuit 158, additional components or external ground fault interruption modules are not required, therefore reducing the cost of manufacture.

Figure 2:
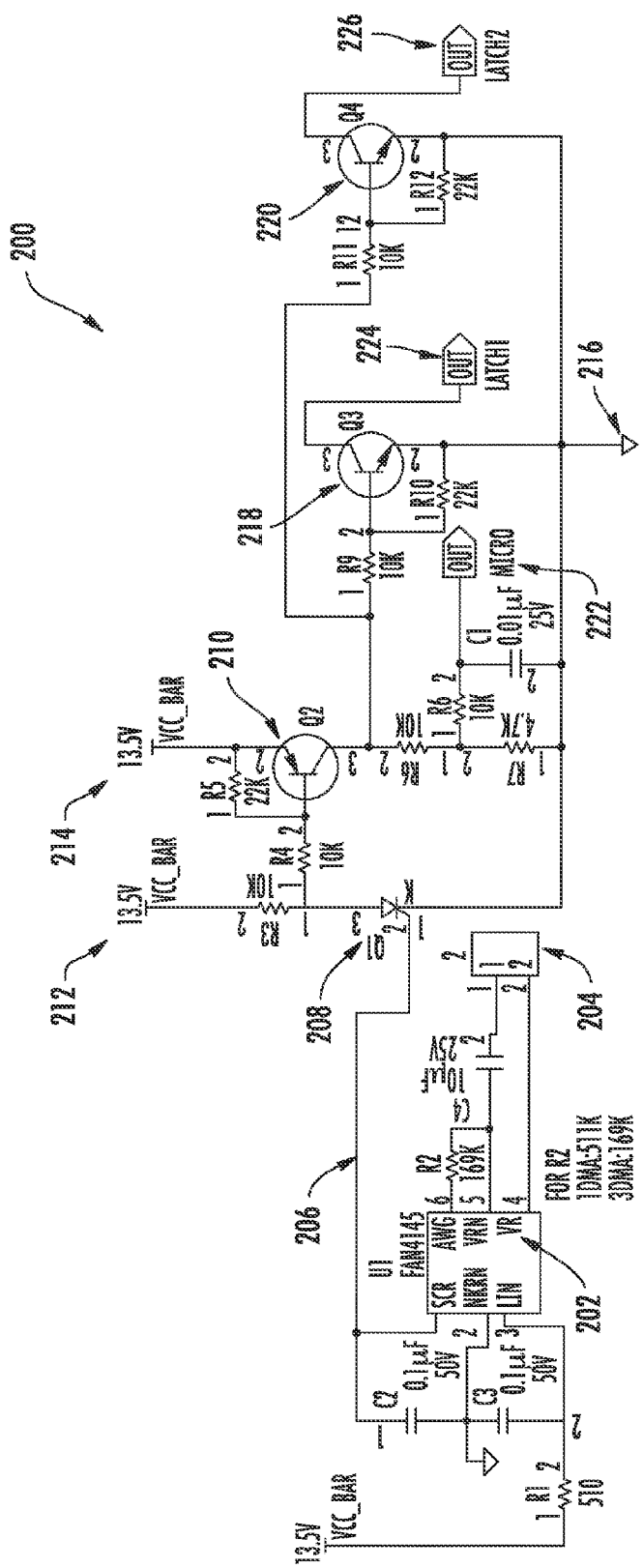
FIG. 2 depicts an exemplary ground fault door latch trip circuit according to an exemplary embodiment of the present disclosure.

FIG. 2 depicts an exemplary ground fault door latch trip circuit 200 according to an exemplary embodiment of the present disclosure. Ground fault door latch trip circuit 200 can include a ground fault interrupter 202. For example, ground fault interrupter 202 can be a low-power controller for alternating current leakage detection.

Ground fault interrupter 202 can be connected to a current transformer 204. For example, current transformer 204 can be a longitudinal transformer. Current transformer 204 can provide ground fault interrupter 202 with a signal that indicates a difference between current in/out on the Line/Neutral conductors of the appliance. In particular, when ground fault interrupter 202 detects a current leakage condition based on the signal received from current transformer 204, ground fault interrupter 202 can output a ground fault signal via conductor 206.

Conductor 206 can provide the ground fault signal to the gate of a thyristor 208. For example, thyristor 208 can be a silicon controlled rectifier. However, other switching devices can be used in place of thyristor 208 as well. When thyristor 208 receives the ground fault signal at its gate, thyristor 208 can be activated so as to allow the flow of power from direct current power sources 212 and 214 to a ground 216.

The flow of power from direct current power sources 212 and 214 to ground 216 can cause the activation of a PNP bipolar junction transistor 210. More particularly, when thyristor 208 does not receive the ground fault signal from ground fault interrupter 202, thyristor 208 blocks the flow of current, thereby creating voltage conditions which result in PNP transistor 210 remaining in a non-conductive state (e.g. "off"). However, when thyristor 208 does receive the ground fault signal from ground fault interrupter 202, thyristor 208 allows the flow of current, thereby creating voltage conditions which result in the activation of PNP transistor 210 into a conductive state (e.g. "on").

When PNP transistor 210 is activated, power flows from direct current power source 214 through PNP transistor 210 to the gate of NPN bipolar junction transistor 218 and the gate of NPN bipolar junction transistor 220. In addition, power flows from direct current power source 214 through PNP transistor 210 to provide the trip signal to a microprocessor of the appliance via connection 222.

When NPN bipolar junction transistors 218 and 220 respectively receive power at their gates, they can be activated into a conductive state (e.g. "on"). When NPN bipolar junction transistors 218 and 220 are on, they can respectively electrically connect connections 224 and 226 to ground 216. However, when NPN bipolar junction transistors 218 and 220 do not respectively receive power at their gates, then they can remain in a non-conductive state (e.g. "off"), and connections 224 and 226 will not be connected to ground 216.

In such fashion, when ground fault interrupter 202 provides the ground fault signal to the gate of thyristor 208, connections 224 and 226 can be electrically connected to ground 216. As will be discussed with reference to FIG. 3, electrically connecting connections 224 and 226 to ground can provide a first and second shunt path and can result in tripping a door latch circuit 300.

One of skill in the art, in light of the disclosures provided herein, will appreciate that ground fault door latch trip circuit 200 is exemplary in nature and is provided as an example circuit that can implement the present disclosure. In particular, due to the nature of electronic components, many alternative configurations and/or components can be used as a suitable ground fault door latch trip circuit 200 to implement the present disclosure. In particular, as an example, a flip flop circuit can be used in place of thyristor 208. As another example, various other switching elements can be used in place of or in addition to transistors 210, 218, and 220.

Figure 3:
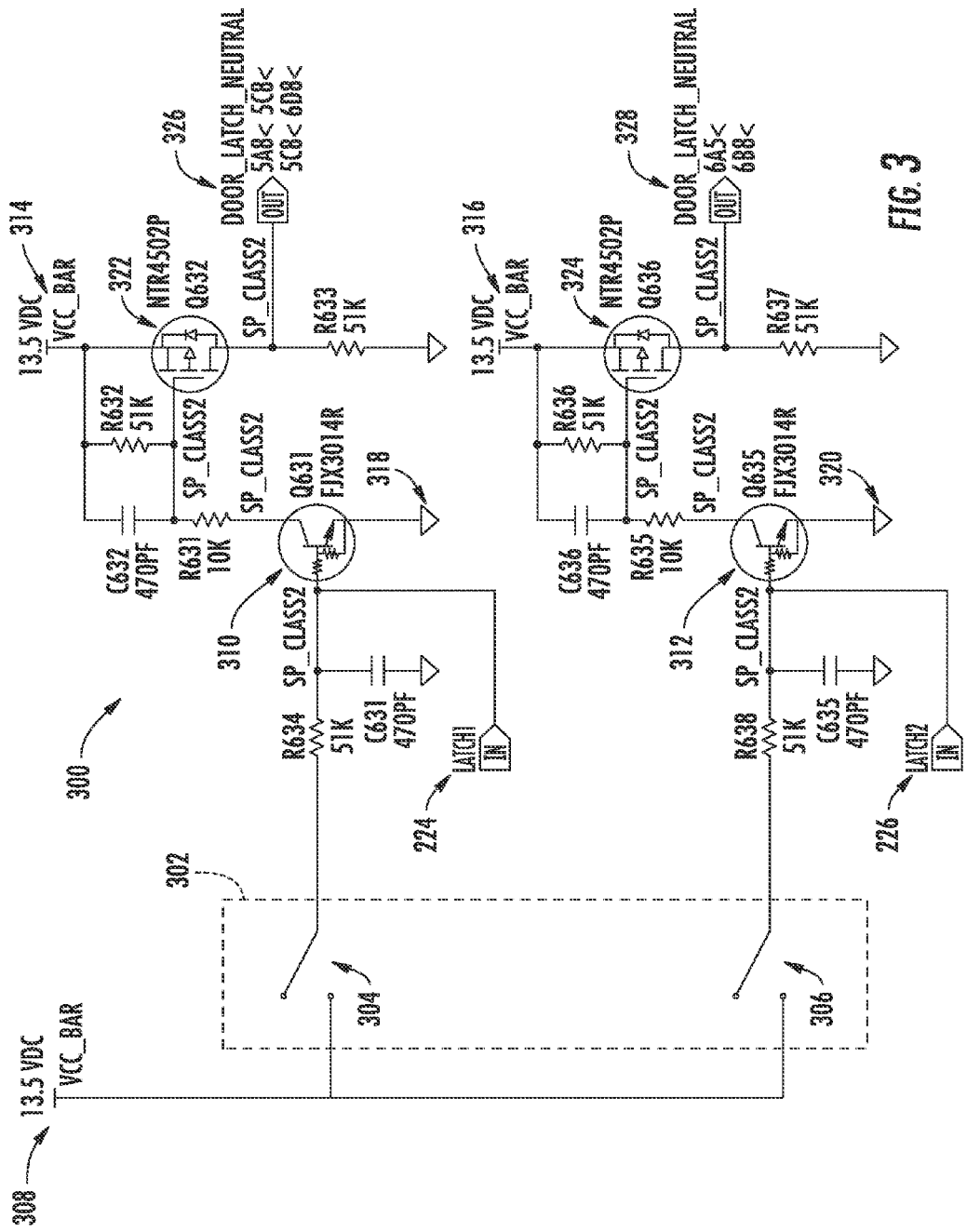
FIG. 3 depicts an exemplary door latch circuit according to an exemplary embodiment of the present disclosure.

FIG. 3 depicts an exemplary door latch circuit 300 according to an exemplary embodiment of the present disclosure. Door latch circuit 300 can include a door latch 302. Door latch 302 can electrically connect and disconnect a first connection 304 and a second connection 306 based on whether a door of the appliance is opened or closed. As an example, each of first connection 304 and second connection 306 can be physically touching and therefore electrically conductive when the door is closed and can be physically broken and therefore electrically disconnected when the door is open.

When door latch 302 is closed, power can respectively flow from a direct current voltage source 308 to the gate of an NPN bipolar junction transistor 310 and to the gate of an NPN bipolar junction transistor 312. When NPN bipolar junction transistors 310 and 312 respectively receive power at their gates, they can be activated into a conductive state (e.g. "on").

When NPN bipolar junction transistors 310 and 312 are on, they can respectively electrically connect direct current voltage sources 314 and 316 to grounds 318 and 320. However, when NPN bipolar junction transistors 310 and 312 do not respectively receive power at their gates, then they can remain in a non-conductive state (e.g. "off"), and voltage sources 314 and 316 will not be connected to grounds 318 and 320.

Furthermore, when direct current voltage sources 314 and 316 are respectively electrically connected to grounds 318 and 320, voltage conditions can be created such that MOSFETS 322 and 324 can be activated into a conductive state (e.g. "on"). When MOSFETS 322 and 324 are on, then power can respectively flow from direct current voltage sources 314 and 316 to connections 326 and 328.

As will be discussed further with respect to FIG. 4, connections 326 and 328 can each be connected to one or more switches. Therefore, as an example, when MOSFETS 322 and 324 are on and power is allowed to respectively flow from direct current voltage sources 314 and 316 to connections 326 and 328, two or more switches can be maintained in a closed position, thereby powering system components.

However, when door latch 302 is open, connections 304 and 306 are broken and power does not flow from direct current voltage source 308 to the gates of NPN bipolar junction transistors 310 and 312. When NPN bipolar junction transistors 310 and 312 do not respectively receive power at their gates, they can be de-activated or otherwise remain in a non-conductive state (e.g. "off").

When NPN bipolar junction transistors 310 and 312 are off, they do not electrically connect direct current voltage sources 314 and 316 to grounds 318 and 320. When direct current voltage sources 314 and 316 are not respectively connected to grounds 318 and 320 by transistors 310 and 312, then voltage conditions are created that result in MOSFETS 322 and 324 being de-activated or otherwise remaining in a non-conductive state (e.g. "off").

When MOSFETS 322 and 324 are off, then power does not respectively flow from direct current voltage sources 314 and 316 to connections 326 and 328. Therefore, as an example, when MOSFETS 322 and 324 are off and power is not allowed to respectively flow from direct current voltage sources 314 and 316 to connections 326 and 328, two or more switches can remain in the open position or can be actuated from the closed position to the open position when current flow via connections 326 and 328 is eliminated.

Thus, in such fashion, door latch circuit 300 can provide power to one or more switches when door latch 302 is closed, resulting in the switches remaining in the closed position and selected appliance components being powered. However, when door latch 302 is opened, then power to the switches can be interrupted, resulting in the switches changing to the open position and the selected appliance components being de-energized.

Furthermore, according to an aspect of the present disclosure, connection 224 can be electrically connected to the gate of NPN transistor 310 and connection 226 can be electrically connected to the gate of NPN transistor 312.

As was discussed with respect to FIG. 2, connections 224 and 226 can respectively provide an electrical connection to a ground when a ground fault signal is received from a ground fault interrupter. However, during normal operation (e.g. when a ground fault event is not detected) connections 224 and 226 can function as open circuits. Thus, connections 224 and 226 can selectively provide shunt paths to ground when the ground fault event is detected.

As such, when connections 224 and 226 actively provide a shunt path to ground, then current respectively flowing from direct current voltage source 308 to the gates of transistors 310 and 312 can be shunted to ground. Therefore, when connections 224 and 226 actively provide a shunt path to ground, transistors 310 and 312 can be de-activated or otherwise remain off.

As discussed above, when transistors 310 and 312 are off, power provided to one or more switches via connections 326 and 328 can be interrupted, resulting in the switches changing to the open position and the selected appliance components being de-energized. In such fashion, ground fault door latch trip circuit 200 of FIG. 2 can selectively trip door latch circuit 300 of FIG. 3 such that door latch circuit 300 operates as if door latch 302 were opened.

One of skill in the art, in light of the disclosures provided herein, will appreciate that door latch circuit 300 is exemplary in nature and is provided as an example circuit that can implement the present disclosure. In particular, due to the nature of electronic components, many alternative configurations and/or components can be used as a suitable door latch circuit 300 to implement the present disclosure. In particular, as an example, various other switching elements, can be used in place of or in addition to transistors 310 and 312 and MOSFETS 322 and 324.

Figure 4:
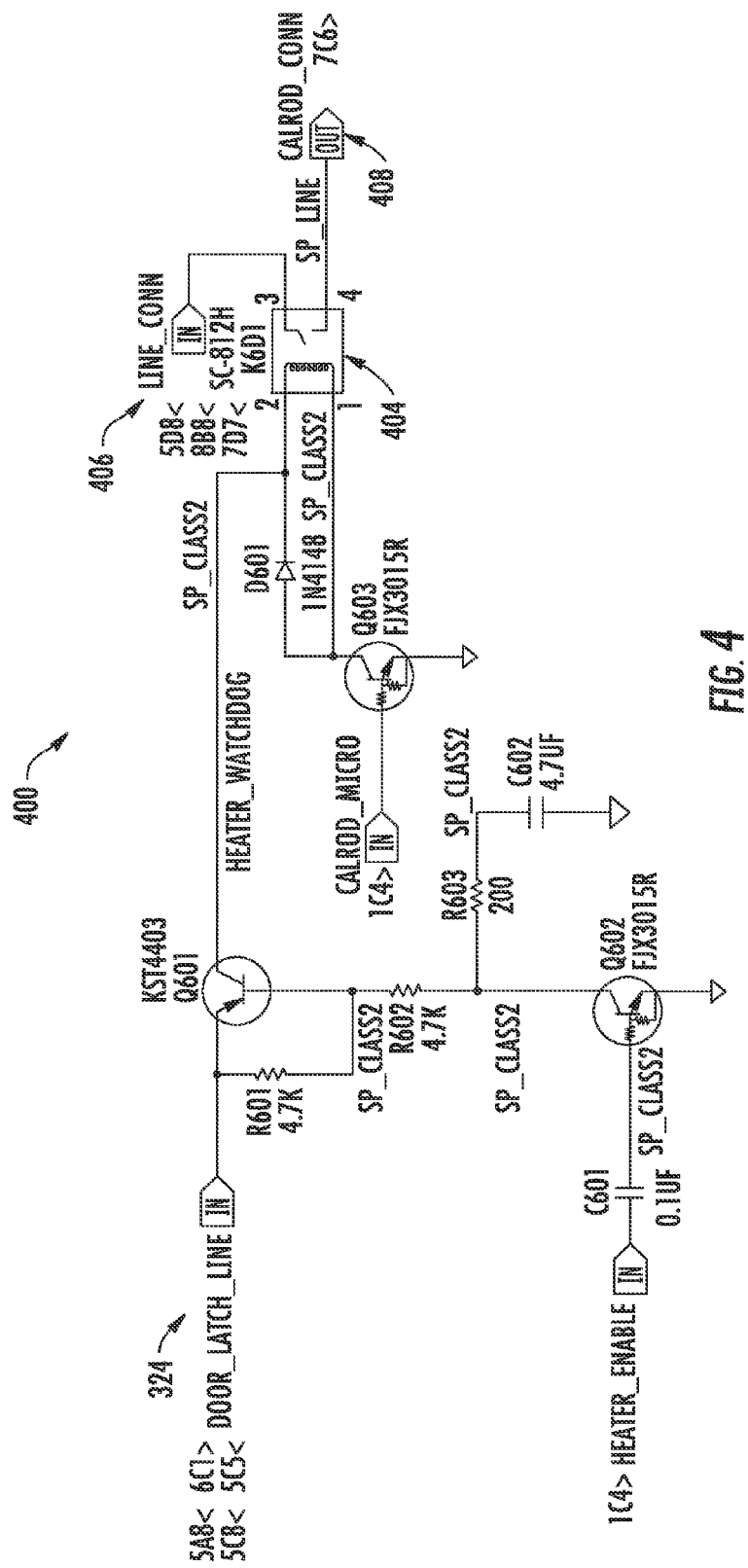
FIG. 4 depicts an exemplary relay circuit according to an exemplary embodiment of the present disclosure.

FIG. 4 depicts an exemplary relay circuit 400 according to an exemplary embodiment of the present disclosure. In particular, relay circuit 400 is configured to allow power from connection 326 of FIG. 3 to actuate a relay 404 into a closed position. When relay 404 is actuated into the closed position, alternating current power can be provided from Line conductor connection 406 to a heating element connection 408.

However, when connection 326 does not provide power to relay 404, relay 404 actuates to an open position, thereby preventing the flow of power from Line conductor connection 406 to the heating element connection 408.

It will be appreciated that the relay circuit 400 depicted in FIG. 4 is associated with the Line conductor of the appliance. Additionally or alternatively, an identical or different relay circuit can also be associated with the Neutral conductor of the appliance. In particular, connection 328 can be used to provide power to an additional relay controlling the flow of power from the powered appliance components to the Neutral conductor.

Furthermore, one of skill in the art, in light of the disclosures provided herein, will appreciate that relay circuit 400 is exemplary in nature and is provided as an example circuit that can implement the present disclosure. In particular, due to the nature of electronic components, many alternative configurations and/or components can be used as a relay circuit 400 to implement the present disclosure. In particular, as an example, various other switches such as, for example, a TRIAC, can be used in place of relay 404.

Figure 5:
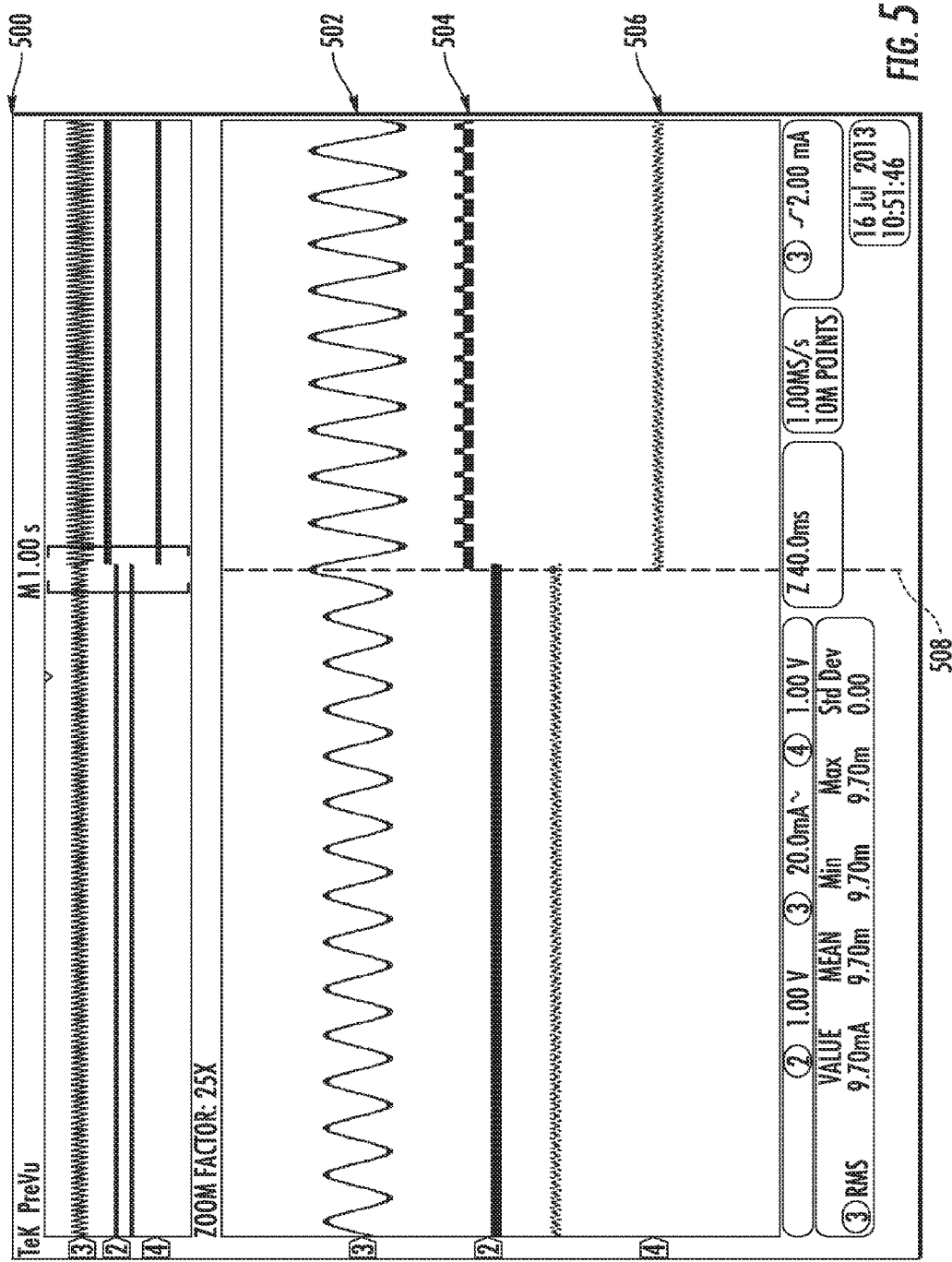
FIG. 5 depicts exemplary signal waveforms according to an exemplary embodiment of the present disclosure.

FIG. 5 depicts exemplary signal waveforms according to an exemplary embodiment of the present disclosure. In particular, FIG. 5 depicts a current differential waveform 502, a ground fault signal 504, and a door latch Neutral signal 506 versus time as a ground fault event is detected.

In particular, current differential waveform 502 shows the current differential between in/out of the Line/Neutral conductors of an appliance versus time. As can be seen in FIG. 5, at about time 508, the current differential waveform 502 increases in amplitude. In particular, the amplitude exceeds a predetermined threshold value.

As a result of the current differential amplitude exceeding the threshold value, the ground fault interrupter detects current leakage and increases the ground fault signal 504 from low to high. The higher value ground fault signal 504 can, for example, be provided to a gate of a thyristor and activate the thyristor into a conductive state.

As a downstream result of the increase in the ground fault signal 504, the door latch Neutral signal 506 decreases from high to low. The door latch Neutral signal 506 can, for example, be provided to a relay associated with an interlock circuit controlling connection of one or more powered appliance components to the Neutral conductor. As a result of the door latch Neutral signal 506 decreasing from high to low, the relay can open and de-energize the powered appliance components.

FIG. 6 depicts exemplary signal waveforms according to an exemplary embodiment of the present disclosure. In particular, FIG. 5 depicts a current differential waveform 602, a trip signal 604, and a door latch Line signal 606 versus time as a ground fault event is detected.

In particular, current differential waveform 602 shows the current differential between in/out of the Line/Neutral conductors of an appliance versus time. As can be seen in FIG. 6, at about time 608, the current differential waveform 602 increases in amplitude. In particular, the amplitude exceeds a predetermined threshold value.

As a result of the current differential amplitude exceeding the threshold value, a ground fault interrupter can detect current leakage and provide a ground fault signal to a ground fault door latch trip circuit. As a result of receiving the ground fault signal, the ground fault door latch trip circuit can increase the trip signal 604 from low to high.

The trip signal 604 can be provided to a microprocessor of the appliance so that the appliance can distinguish between a ground fault trip event and a door open condition. As such, the appliance can provide a smart response to the ground fault trip event.

As a downstream result of the ground fault interrupter providing the ground fault signal to the ground fault door latch trip circuit, the door latch Line signal 606 decreases from high to low. The door latch Line signal 606 can, for example, be provided to a relay associated with an interlock circuit controlling connection of one or more powered appliance components to the Line conductor. As a result of the door latch Line signal 606 decreasing from high to low, the relay can open and de-energize the powered appliance components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance comprising:
   a door having a closed position and an open position;
   a door circuit, wherein the door circuit is configured to cause the actuation of one or more relays when the door transitions from the closed position to the open position when the appliance is operating, and wherein the actuation of the one or more relays prevents one or more components of the appliance from being energized, wherein at least one of the one or more components is a water valve;
   a ground fault interrupter configured to detect current leakage occurring at the appliance and to provide a ground fault signal when the current leakage is detected; and
   a ground fault door trip circuit configured to receive the ground fault signal from the ground fault interrupter and to trip the door circuit when the ground fault signal is received such that the one or more relays are actuated;
   wherein the door circuit comprises one or more switching elements which cause power to flow from a direct current voltage source to one or more relay circuits when the door is in the closed position;
   the one or more relay circuits respectively control actuation of the one or more relays; and
   the one or more switching elements cause power not to flow from the direct current voltage source to the one or more relay circuits when the door is in the open position;
   wherein the ground fault door trip circuit trips the door circuit by operating the one or more switching elements;
   wherein the one or more switching elements comprise an NPN bipolar junction transistor with its collector electrically connected to the direct current power source and its emitter electrically connected to a ground; and
   the door circuit provides a door closed current to the gate of the NPN bipolar junction transistor when the door is in the closed position, such that the NPN bipolar junction transistor allows the flow of current from its collector to its emitter; and
   the flow of current from the collector to the emitter of the NPN bipolar junction transistor causes power to flow from the direct current voltage source to the one or more relay circuits.

2. The appliance of claim 1, wherein the flow of current from the collector to the emitter of the NPN bipolar junction transistor causes power to flow from the direct current voltage source to the one or more relay circuits by switching on a MOSFET.

3. The appliance of claim 1, wherein the ground fault door trip circuit trips the door circuit by shunting the door closed current to ground, such that the NPN bipolar junction transistor does not allow the flow of current from its collector to its emitter.

4. The appliance of claim 3, wherein the ground fault door trip circuit comprises a second switching element configured to electrically connect the gate of the NPN bipolar junction transistor to ground when ground fault interrupter provides the ground fault signal.

5. An appliance comprising:
   a powered component;
   a switch positioned between a first power source and the powered component and configured to allow the flow of power from the first power source to the powered component when the switch is in a closed position;
   a door circuit comprising a door latch and a first switching element, the door circuit configured to provide a door signal when a door of the appliance is closed and configured to cease providing the door signal when the door is open, wherein the door signal causes the switch to maintain the closed position, and wherein the door latch is configured to electrically connect a gate of the first switching element to a second power source when the door is closed and electrically disconnect the gate of the first switching element from the second power source when the door is in the open position;

a ground fault interrupter configured to detect current leakage occurring at the appliance; and a ground fault door trip circuit configured to cause the door circuit to cease providing the door signal when the ground fault interrupter detects current leakage occurring at the appliance, wherein the ground fault door trip circuit is further configured to cause the door circuit to cease providing the door signal when the ground fault interrupter detects current leakage occurring at the appliance by electrically connecting the gate of the first switching element to a ground when the ground fault interrupter detects current leakage occurring at the appliance, and wherein the ground fault door trip circuit electrically connects the gate of the first switching element to the ground by electrically connecting the gate of a second switching element to a third power source, and wherein the second switching element is electrically positioned between the gate of the first switching element and the ground.

6. The appliance of claim 5, wherein the ground fault door trip circuit electrically connects the gate of the second switching element to the third power source by receiving a ground fault signal from the ground fault interrupter at a gate of a thyristor included in the ground fault door trip circuit.

7. The appliance of claim 6, wherein the thyristor allows the flow of power from the third power source to the ground when the ground fault signal is received at the gate of the thyristor.

8. The appliance of claim 7, wherein the flow of power from the third power source to the ground results in at least one voltage condition that causes the electrical connection of the gate of the second switching element to the third power source.

9. The appliance of claim 5, wherein:
the first power source comprises an alternating current power source; and
the second and third power sources comprise connections to a direct current voltage bus.

10. The appliance of claim 5, wherein the ground fault door trip circuit provides a trip signal to a microprocessor of the appliance when the ground fault interrupter detects current leakage occurring at the appliance, whereby the microprocessor can distinguish between a current leakage condition and a door open condition.

11. The appliance of claim 5, wherein the appliance comprises a dishwasher and the powered component comprises a heating element.

* * * * *